(12) United States Patent
Greenstein et al.

(10) Patent No.: US 11,070,880 B2
(45) Date of Patent: *Jul. 20, 2021

(54) CUSTOMIZED RECOMMENDATIONS OF MULTIMEDIA CONTENT STREAMS

(71) Applicant: The DIRECTV Group, Inc., El Segundo, CA (US)

(72) Inventors: Michael Greenstein, El Segundo, CA (US); Percival Pacifico, Chino Hills, CA (US); Jason Payabyab, Chino, CA (US); Kue Xiong, Lakewood, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/796,389

(22) Filed: Feb. 20, 2020

(65) Prior Publication Data

US 2020/0196013 A1 Jun. 18, 2020

Related U.S. Application Data

(63) Continuation of application No. 15/438,469, filed on Feb. 21, 2017, now Pat. No. 10,609,453.

(51) Int. Cl.
*H04N 21/466* (2011.01)
*H04L 29/06* (2006.01)
(Continued)

(52) U.S. Cl.
CPC ....... *H04N 21/4668* (2013.01); *G06F 16/437* (2019.01); *G06F 16/4387* (2019.01);
(Continued)

(58) Field of Classification Search
CPC ........ G06Q 50/01; G06F 16/438–4393; G06F 16/638–639; G06F 16/735–739;
(Continued)

(56) References Cited

U.S. PATENT DOCUMENTS 5,977,964 A 11/1999 Williams et al.
6,177,931 B1 1/2001 Alexaander et al.
(Continued)

FOREIGN PATENT DOCUMENTS

WO 0193161 A1 12/2001
WO 2015/0119455 A1 8/2015
(Continued)

OTHER PUBLICATIONS

Hu et al., "Collaborative Filtering for Implicit Feedback Datasets", Eighth IEEE International Conference on Data Mining, 2008, 10 pages.
(Continued)

*Primary Examiner* — Brendan Y Higa
(74) *Attorney, Agent, or Firm* — Amin, Turocy & Watson, LLP

(57) ABSTRACT

Customized recommendations of multimedia content streams are provided herein. A method can include facilitating, by a network device of a wireless network and comprising a processor, an output of a recommendation of a first multimedia content stream at a communications device based on a monitored interaction determined to have been performed by an identified entity at the communications device. The method can also include facilitating, by the network device, a first transmission of the first multimedia content stream to the communications device in response to an acceptance of the recommendation of the first multimedia content stream received from the communications device. The first multimedia content stream can be renderable for consumption at the communications device.

20 Claims, 10 Drawing Sheets

(51) Int. Cl.
| | |
|---|---|
| H04L 29/08 | (2006.01) |
| H04N 21/262 | (2011.01) |
| H04N 21/414 | (2011.01) |
| G06F 16/435 | (2019.01) |
| H04N 21/442 | (2011.01) |
| H04N 21/41 | (2011.01) |
| H04N 21/45 | (2011.01) |
| H04N 21/25 | (2011.01) |
| H04N 21/422 | (2011.01) |
| G06F 16/638 | (2019.01) |
| G06F 16/438 | (2019.01) |
| G06F 16/735 | (2019.01) |

(52) U.S. Cl.
CPC ......... *G06F 16/639* (2019.01); *G06F 16/735* (2019.01); *H04L 29/08675* (2013.01); *H04L 65/60* (2013.01); *H04L 67/22* (2013.01); *H04N 21/251* (2013.01); *H04N 21/26258* (2013.01); *H04N 21/4126* (2013.01); *H04N 21/41407* (2013.01); *H04N 21/42203* (2013.01); *H04N 21/44218* (2013.01); *H04N 21/44222* (2013.01); *H04N 21/45* (2013.01); *H04N 21/4532* (2013.01)

(58) Field of Classification Search
CPC ......... H04N 21/25–251; H04N 21/258; H04N 21/25891; H04N 21/26258; H04N 21/45; H04N 21/466–4668; H04L 29/08936; H04L 51/32; H04L 65/4069–4084; H04L 67/22; H04L 67/306; H04L 29/08675
See application file for complete search history.

(56) References Cited

U.S. PATENT DOCUMENTS

| | | | |
|---|---|---|---|
| 7,370,342 | B2 | 5/2008 | Ismail et al. |
| 7,487,164 | B2 | 2/2009 | Saito et al. |
| 7,640,562 | B2 | 12/2009 | Bouilloux-Lafont et al. |
| 8,006,266 | B2 | 8/2011 | Kurapati et al. |
| 8,250,605 | B2 | 8/2012 | Opaluch |
| 8,572,098 | B2 | 10/2013 | Weare |
| 8,642,872 | B2 | 2/2014 | Lu et al. |
| 8,799,944 | B2 | 8/2014 | Angiolillo et al. |
| 8,904,441 | B2 | 12/2014 | Westberg |
| 8,924,999 | B1 | 12/2014 | Santangelo et al. |
| 9,241,121 | B2 | 1/2016 | Rudolph |
| 9,269,047 | B2 | 2/2016 | Kumar et al. |
| 9,298,810 | B2 | 3/2016 | Fife et al. |
| 9,445,036 | B2 | 9/2016 | Hamano et al. |
| 9,473,730 | B1 | 10/2016 | Roy et al. |
| 9,699,490 | B1 | 7/2017 | Japp |
| 2002/0002483 | A1 | 1/2002 | Siegel et al. |
| 2002/0104081 | A1* | 8/2002 | Candelore ........ H04N 21/44222 725/9 |
| 2002/0129368 | A1 | 9/2002 | Schlack et al. |
| 2003/0061239 | A1 | 3/2003 | Yoon |
| 2003/0225777 | A1 | 12/2003 | Marsh |
| 2004/0001081 | A1 | 1/2004 | Marsh |
| 2004/0153373 | A1 | 8/2004 | Song et al. |
| 2007/0156676 | A1 | 7/2007 | Rosenberg |
| 2007/0186243 | A1 | 8/2007 | Pettit et al. |
| 2008/0040474 | A1 | 2/2008 | Zukerberg et al. |
| 2008/0242221 | A1 | 10/2008 | Shapiro et al. |
| 2009/0018845 | A1* | 1/2009 | Morel ............... H04N 21/4532 705/317 |
| 2009/0055759 | A1 | 2/2009 | Svenden |
| 2010/0023578 | A1 | 1/2010 | Brant et al. |
| 2010/0076857 | A1* | 3/2010 | Deo ..................... H04L 67/306 705/26.1 |
| 2010/0162115 | A1 | 6/2010 | Ringewald et al. |
| 2011/0179139 | A1 | 7/2011 | Starkenburg et al. |
| 2011/0283236 | A1 | 11/2011 | Beaumier et al. |
| 2011/0314030 | A1 | 12/2011 | Burba et al. |
| 2013/0031162 | A1 | 1/2013 | Willis et al. |
| 2013/0046772 | A1 | 2/2013 | Gu et al. |
| 2013/0166488 | A1 | 6/2013 | Yang et al. |
| 2013/0347038 | A1 | 12/2013 | Lee |
| 2014/0074846 | A1 | 3/2014 | Moss et al. |
| 2014/0075308 | A1 | 3/2014 | Sanders et al. |
| 2014/0114772 | A1 | 4/2014 | Mok et al. |
| 2014/0298387 | A1 | 10/2014 | Boyer et al. |
| 2014/0122502 | A1 | 11/2014 | Berenson et al. |
| 2014/0337875 | A1* | 11/2014 | Dankberg ........ H04N 21/47202 725/23 |
| 2014/0344289 | A1 | 11/2014 | Berenson et al. |
| 2015/0067724 | A1 | 3/2015 | Johnson et al. |
| 2015/0081687 | A1* | 3/2015 | Lee ................... G06F 16/90335 707/723 |
| 2015/0178788 | A1 | 6/2015 | Weber et al. |
| 2015/0254333 | A1* | 9/2015 | Fife .......................... G06F 40/20 704/246 |
| 2015/0324356 | A1* | 11/2015 | Andres Gutierrez ........................ H04N 21/4532 707/734 |
| 2015/0347416 | A1 | 12/2015 | Lin et al. |
| 2015/0358661 | A1 | 12/2015 | Navarro et al. |
| 2015/0358663 | A1* | 12/2015 | Malone ............ H04N 21/25891 725/45 |
| 2016/0044356 | A1* | 2/2016 | Eatedali ........... H04N 21/25891 725/34 |
| 2016/0062569 | A1* | 3/2016 | Jenkins ............ H04N 21/44016 715/716 |
| 2016/0112761 | A1 | 4/2016 | Venkataraman et al. |
| 2016/0180193 | A1* | 6/2016 | Masters ............... G06K 9/3216 382/218 |
| 2016/0227283 | A1 | 8/2016 | Kelly et al. |
| 2016/0335704 | A1* | 11/2016 | Chin ................. G06Q 30/0277 |
| 2016/0337704 | A1* | 11/2016 | Binder ............... H04N 21/4332 |
| 2017/0068423 | A1 | 3/2017 | Napolitano et al. |
| 2017/0161618 | A1* | 6/2017 | Swaminathan ........ G06Q 30/02 |
| 2017/0169349 | A1 | 6/2017 | Qi |
| 2017/0195731 | A1 | 7/2017 | Girlamdo et al. |
| 2017/0286425 | A1* | 10/2017 | Peterson ............... H04L 67/306 |
| 2018/0025005 | A1 | 1/2018 | Cao et al. |

FOREIGN PATENT DOCUMENTS

| | | |
|---|---|---|
| WO | 2016/048913 A1 | 3/2016 |
| WO | 2016/088015 A1 | 6/2016 |

OTHER PUBLICATIONS

Zhang et al., "A Personalized TV Guide System Compliant with MHP", IEEE Transactions on Consumer Electronics, May 2005, pp. 731-737, vol. 51, No. 2, 7 pages.

Hsu et al., "AIMED—A Personalized TV Recommendation System" European Conference on Interactive Television, May 2007, Springer-Verlag Berlin Heidelberg, 10 pages.

Rovira et al., "Index TV: A MPEG-7 Based Personalized Recommendation System for Digital TV", IEEE International Conference on Multimedia and Expo (ICME), 2004, pp. 823-826, 4 pages.

Stupar et al., "One Solution of STB Users Cloud Based Profiling", IEEE Fourth International Conference on Consumer Electronics Berlin (ICCEBerlin), 2014, pp. 364-366, 3 pages.

Non-Final Office Action received for U.S. Appl. No. 15/438,469 dated Feb. 25, 2019, 42 pages.

Final Office Action received for U.S. Appl. No. 15/438,469 dated Aug. 12, 2019, 18 pages.

* cited by examiner

US 11,070,880 B2

CUSTOMIZED RECOMMENDATIONS OF MULTIMEDIA CONTENT STREAMS

RELATED APPLICATION

The subject patent application is a continuation of, and claims priority to, U.S. patent application Ser. No. 15/438,469, now U.S. Pat. No. 10,609,453, filed Feb. 21, 2017, and entitled "CUSTOMIZED RECOMMENDATIONS OF MULTIMEDIA CONTENT STREAMS," the entirety of which application is hereby expressly incorporated by reference herein.

TECHNICAL FIELD

This disclosure relates generally to the field of mobile communication and, more specifically, to, customized recommendations of multimedia content streams.

BACKGROUND

As communication networks evolve, various communications devices are used to view streaming content (e.g., a movie, a video, or other content) and recommendations related to additional streaming content can be provided. However, these recommendations are generic in nature and might not be of interest to the viewer. Accordingly, many of these recommendations are disregarded and can frustrate the viewer due to the lack of applicability to the viewer's preferences.

BRIEF DESCRIPTION OF THE DRAWINGS

Various non-limiting embodiments are further described with reference to the accompanying drawings in which.

DETAILED DESCRIPTION

Figure 1:
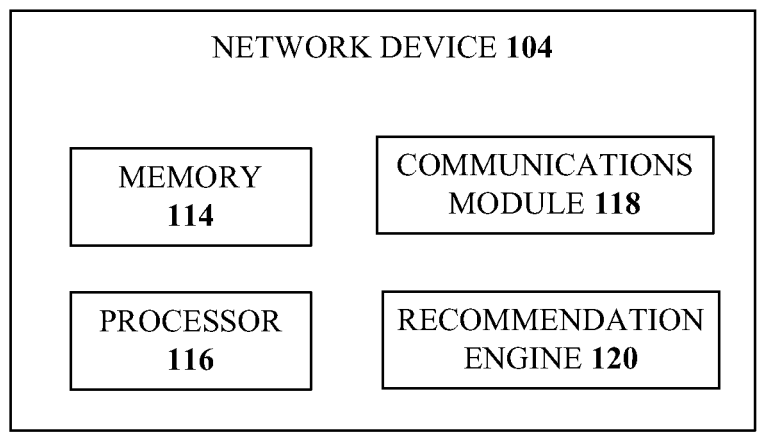
FIG. 1 illustrates an example, non-limiting communications system for providing customizable recommendations related to multimedia content streams in accordance with one or more embodiments described herein.
Figure 1:
Figure 1:
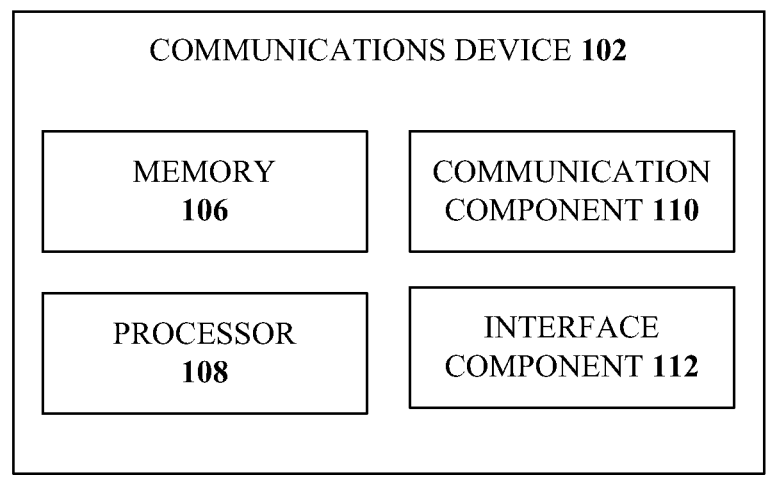

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure can be embodied in many different forms and should not be construed as limited to the example embodiments set forth herein.

Described herein are systems, methods, articles of manufacture, and other embodiments or implementations that can facilitate customization of multimedia content streams. In one embodiment, described herein is a method that can include facilitating, by a network device of a wireless network and comprising a processor, an output of a recommendation of a first multimedia content stream at a communications device based on a monitored interaction determined to have been performed by an identified entity at the communications device. The monitored interaction can be determined to be related to a content item of the first multimedia content stream. The recommendation of the first multimedia content stream can be based on a comparison between a weight assigned to the first multimedia content stream and respective weights assigned to second multimedia content streams that comprise the content item. The weight can be determined based on the monitored interaction and historical interactions of the identified entity. The method can also include facilitating, by the network device, a first transmission of the first multimedia content stream to the communications device in response to an acceptance of the recommendation of the first multimedia content stream received from the communications device. The first multimedia content stream can be renderable for consumption at the communications device.

According to an implementation, the output of the recommendation of the first multimedia content stream can be a first output of a first recommendation of the first multimedia content stream. Based on the acceptance of the first recommendation, the method can also comprise facilitating, by the network device, a second output of a second recommendation of a second multimedia content stream of the second multimedia content streams. The second multimedia content stream can be selected based on the weight of the second multimedia content stream and respective weights assigned to the second multimedia content streams that comprise the content item.

In an example, the monitored interaction can comprise a social network interaction at the communications device and data of the social network interaction can comprise an indication of the content item of the first multimedia content stream. In another example, the weight and the respective weights can indicate a rank ordering between the first multimedia content stream and the second multimedia content streams. In a further example, the monitored interaction can comprise an input, received from the identified entity at the communications device, of a request for multimedia content streams, comprising the first multimedia content stream and the second multimedia content streams, which can comprise a specific content item.

In another example, the identified entity can be a first identified entity and the monitored interaction can comprise an audible conversation stream, detected by the communications device, between the first identified entity and a second identified entity. The content item can be detected during the audible conversation stream by the communications device.

According to some implementations, the content item can be a first content item and the output of the recommendation can be a first output of a first recommendation. According to this implementation, the method can further comprise, in response to an indication, received from the communications device, of an interest in an input summary feed, identifying, by the network device, a second content item. The input summary feed can comprise frequently updated information available to subscribers of the input summary feed. The method can also include facilitating, by the network device, a second output of a second recommendation of a second multimedia content stream of the second multimedia content streams, which comprises the second content item. The second multimedia content stream can be selected based on an additional comparison between the weight assigned to the second multimedia content stream and the respective weights assigned to the second multimedia content streams that comprise the second content item. Further to this implementation, the indication can be a first indication and the method can include, in response to a second indication, received from the communications device, that the interest in the input summary feed is no longer present, removing, by the network device, the second recommendation from a group of recommendations output at the communications device.

According to some implementations, the method can include, in response to a denial of the recommendation of the first multimedia content stream, modifying the weight assigned to the first multimedia content stream from a first level to a second level. The first level can indicate an interest in the first multimedia content stream and the second level can indicate a lack of the interest in the first multimedia content stream.

In accordance with an implementation, the output can be a first output and the recommendation of the first multimedia content stream can be a first recommendation of the first multimedia content stream. The method further comprises storing, by the network device, the content item in a data store of content items. Additional multimedia content streams other than the first multimedia content stream and the second multimedia content streams can be compared to additional content items in the data store of content items. The method can also include facilitating, by the network device, a second output of a second recommendation of a third multimedia content stream of the additional multimedia content streams. Further to this implementation, the method can include removing, by the network device, the content item from the data store of content items based on an indication received from the communications device that the content item is not of interest to the identified entity. Removal of the content item from the database can include discontinuing recommendations of multimedia content streams, comprising the first multimedia content stream, the second multimedia content streams and the additional multimedia content streams, that can be recommended based on the content item.

In accordance with some implementations, the content item can be a first content item, wherein the output of the recommendation is a first output of a first recommendation. The method further comprises facilitating, by the network device, a second recommendation of a second multimedia content stream of the second multimedia content streams based on a determination that the second multimedia content stream comprises the first content item and a second content item. The second content item can be determined based on the monitored interaction performed by the identified entity at the communications device. The second multimedia content stream can be recommended prior to a third recommendation of a third multimedia content stream that comprises the first content item and does not comprise the second content item.

According to another embodiment, a system can include a processor and a memory that stores executable instructions that, when executed by the processor, facilitate performance of operations. The operations can include outputting a recommendation of a first multimedia content stream that comprises a content item determined based on a monitored interaction. The recommendation of the first multimedia content stream can be based on a comparison between a weight assigned to the first multimedia content stream and respective weights assigned to second multimedia content streams that comprise the content item, other than the first multimedia content stream. The weight can be determined based on the monitored interaction and historical interactions. The operations can also include facilitating a first transmission of the first multimedia content stream and a second transmission of the second multimedia content stream in an order of transmission based on a selection received from the communications device.

In an example, the first rank and the second rank can be assigned based on interactions performed at the communications device. A first interaction of the interactions can be determined to be related to the first content item. A second interaction of the interactions can be determined to be related to the second content item.

In an implementation, the interactions can comprise a social network interaction at the communications device, and a subject of the social network interaction can comprise an indication of the first content item. According to another implementation, the interactions can comprise audible conversation streams monitored by the communications device, and at least the first content item can be identified within an audible conversation stream of the audible conversation streams. In accordance with another implementation, the interactions can comprise a subscription to an input summary feed that comprises the first content item, the input summary feed can comprise regularly changed information.

According to yet another embodiment, described herein is a machine-readable storage medium comprising executable instructions that, when executed by a processor, facilitate performance of operations. The operations can include outputting a recommendation of a first multimedia content stream that comprises a content item determined based on a monitored interaction. The recommendation of the first multimedia content stream can be based on a comparison between a weight assigned to the first multimedia content stream and respective weights assigned to second multimedia content streams that comprise the content item other than the first multimedia content stream. The weight can be determined based on the monitored interaction and historical interactions. The operations can also comprise, in response to an acceptance of the recommendation of the first multimedia content stream, outputting data that comprises the first multimedia content stream at a communications device based on a schedule determined by an identified entity associated with the communications device.

In an example, the operations can also include monitoring a social network interaction at the communications device, wherein a subject of the social network interaction comprises an indication of the content item of the first multimedia content stream. In an additional or alternative example, the operations can include monitoring an audible conversation stream of the identified entity, wherein the audible conversation stream comprises an identification of the content item.

Referring initially to FIG. 1 illustrated is an example, non-limiting communications system 100 for providing customizable recommendations related to multimedia content streams in accordance with one or more embodiments described herein. The various aspects provided herein can provide a viewer (e.g., a viewing entity) a mechanism to specify content that is of interest to the viewer. The viewer can be an identified entity associated with one or more communications devices. For example, while the viewer is consuming streaming content through the communications device, the viewer can be provided one or more recommendations, which can be further customized by the viewer. For example, the viewer can define a custom input feed, which can be utilized to determine and output related content to the viewer.

The non-limiting communications system 100 can include a communications device 102 and a network device 104. The network device 104 can be included in a group of network devices of a wireless network. Although only a single communications device and a single network device are shown and described, the various aspects are not limited to this implementation. Instead, multiple communications devices and/or multiple network devices can be included in a communications system.

The communications device 102 can include a memory 106, a processor 108, a communication component 110, and an interface component 112. The memory 106 can be operatively connected to the processor 108. The memory 106 can store executable instructions that, when executed by the processor 108 facilitate performance of operations. Further, the processor 108 can be utilized to execute computer executable components stored in the memory 106.

For example, the memory 106 can store protocols associated with customization of multimedia content stream as discussed herein. Further, the memory 106 can facilitate action to control communication between the communications device 102 and the network device 104 such that the non-limiting communications system 100 can employ stored protocols and/or algorithms to achieve improved communications in a wireless network as described herein. According to some implementations, the communication component 110 can facilitate communications between an identified entity associated with the communications device 102 (e.g., an owner of the communications device 102, a user of the communications device 102, and so on).

The communication component 110, for example, can be a transmitter/receiver configured to transmit to and/or receive data from the network device 104, other network devices, and/or other mobile devices. Through the communication component 110, the communications device 102 can concurrently transmit and receive data, can transmit and receive data at different times, or combinations thereof. The interface component 112 can output one or more recommendations and/or one or more multimedia streams at the communications device 102, as discussed herein.

The network device 104 can include a memory 114, a processor 116, a communications module 118, and a recommendation engine 120. The memory 114 can be operatively connected to the processor 116. The memory 114 can store executable instructions that, when executed by the processor 116 facilitate performance of operations. Further, the processor can be utilized to execute computer executable components stored in the memory 114.

The memory 114 can store protocols associated with customization of multimedia content streams as discussed herein. Further, the memory 114 can facilitate action to control communication between the network device 104 and the communications device 102 such that the non-limiting communications system 100 can employ stored protocols and/or algorithms to achieve improved communications in a wireless network as described herein.

According to some implementations, the communications module 118 can facilitate communications between an identified entity associated with the communications device 102 (e.g., an owner of the communications device 102, a user of the communications device 102 and so on). Further, the communications module 118 can facilitate communication with the communications device 102, other network devices, and/or other mobile devices.

The recommendation engine 120 can provide one or more recommendations related to a multimedia content streams determined to be of interest to the identified entity. For example, as the identified entity is operating the communications device 102, an input feed can be identified and can include a discussion of a particular actor (e.g., identified by real name, character name, or in another manner). Based on identification of the particular actor within the input feed, the non-limiting communications system 100 can be configured to obtain other roles played by the actor or other content in which the actor has performed, or related to the actor. Thus, a recommendation can be output to the identified entity that provides a movie or a list of movies in which the actor has performed and which can be of interest to the identified entity. According to other examples, the input received can indicate a title of a movie of interest, a topic of interest, and so on. In these examples, the recommendation can include similar movies, movies that relate to the topic of interest, and so on.

In some implementations, the information can be received from the communications device 102 automatically based on observing a behavior and/or interactions performed at the communications device 102 (e.g., by the identified entity), or based on conversations of the identified entity (both verbal or through manual interaction) detected by the communications device 102. The monitored interactions can be electronic communications, electronic interactions, and/or electronic transactions determined to have been performed by the identified entity at the communications device 102 (or at other communications devices of the identified entity). According to some implementation, the monitored interactions can be social network interactions. In some cases, the information can be directly received from the identified entity based on an interaction between the identified entity and the non-limiting communications system 100 (e.g., through the interface component 112). Accordingly, an input feed can provide the identified entity control over content discovery of one or more multimedia content streams performed by the non-limiting communications system 100.

Through the communications module 118, the network device 104 can facilitate transmission of the multimedia content stream at the communications device 102. For example, based on a determination that the recommendation output by the recommendation engine 120 is accepted, an indication that the multimedia content stream should be rendered for consumption at the communications device 102 can be sent to the communications device 102 or to another device that can provide the multimedia content stream.

According to some implementations, more than one communications device can be associated with the identified entity. For example, the identified entity can utilize two or more communications devices (e.g., a mobile phone, a laptop computer, an Internet of Things (IoT) device, and so on), which can be determined to be associated with the identified entity. Thus, the non-limiting communications system 100 can be configured to monitor interactions across all associated communications device and facilitate output of the multimedia content stream at one or more of the communications devices.

The respective memories 106, 114 can store respective protocols associated with customization of multimedia content stream output at a communications device, taking action to control communication between the communications device 102 and the network device 104, such that the non-limiting communications system 100 can employ stored protocols and/or algorithms to achieve improved communications in a wireless network as described herein. It should be appreciated that data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The respective processors 108, 116 can facilitate respective analysis of information related to customized recommendations of multimedia content streams in a communication network. The processors 108, 116 can be processors dedicated to analyzing and/or generating information received, a processor that controls one or more components of the non-limiting communications system 100, and/or a processor that both analyzes and generates information received and controls one or more components of the non-limiting communications system 100.

Further, the term network device (e.g., network node, network node device) is used herein to refer to any type of network node serving a communications devices and/or connected to other network nodes, network elements, or another network node from which the communications devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network device 104) can include but are not limited to: NodeB devices, base station (BS) devices, access point (AP) devices, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like.

Figure 2:
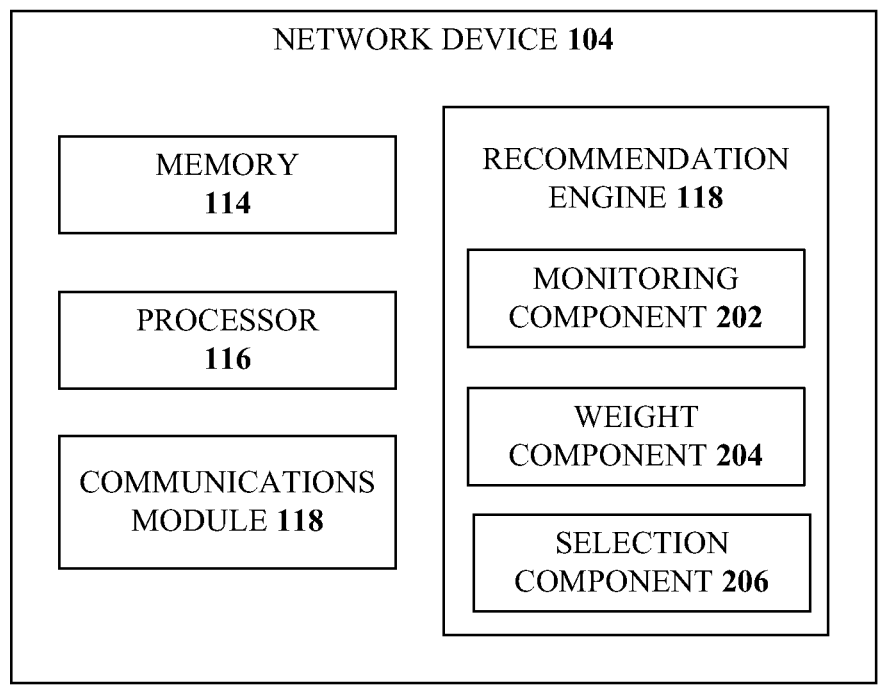
FIG. 2 illustrates an example, non-limiting communications system for monitoring interactions and providing customizable recommendations based on the monitored interactions in accordance with one or more embodiments described herein.
Figure 2:
Figure 2:
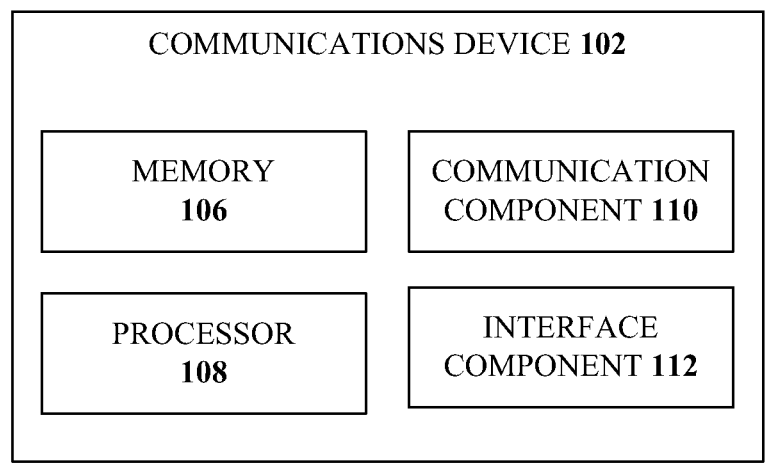

FIG. 2 illustrates an example, non-limiting communications system 200 for monitoring interactions and providing customizable recommendations based on the monitored interactions in accordance with one or more embodiments described herein. Repetitive description of like elements employed in other embodiments described herein is omitted for sake of brevity. The non-limiting communications system 200 can comprise one or more of the components and/or functionality of non-limiting communications system 100, and vice versa.

The non-limiting communications system 200 can include a monitoring component 202, a weight component 204, and a selection component 206. The monitoring component 202 can receive data related to one or more monitored interactions. For example, the interactions can be captured by the communications device 102 and sent to the network device 104 for evaluation (e.g., via the communication component 110). The monitored interactions can be received at the communications device 102 through the interface component 112. The monitored interactions can be electronic communications, electronic interactions, and/or electronic transactions determined to have been performed by an identified entity at the communications device 102 (or other communications devices of the identified entity). According to some implementations, the monitored interactions can be a behavior of the identified entity.

In an example, monitored interactions can be actions performed with respect to a social network. Such actions can include electronic communications with other entities of the social network and/or interests identified within the social network (e.g., indicating an interest or "like" in the content, indicating an interest by following or accepting electronic communications, and so on). In another example, monitored interactions can be subscribing to an input summary feed that comprises frequently updated information available to subscribers of the input summary feed. The input summary feed can be related to any type of item of interest.

If multiple communications devices are associated with an identified entity, monitored interactions at the multiple communications device can be considered to be related to the identified entity. As monitored interactions are received at the network device 104, the monitored interactions can be stored in a data store or another device (e.g., the memory 114). The monitored interactions can be stored as historical interactions according to an implementation.

The weight component 204 can assign respective weights to the one or more content items and/or the one or more multimedia streams. The respective weights can indicate a rank ordering between the multimedia content streams. The weight component 204 can select the weights based upon a determined interest of the identified entity for content items and/or multimedia content stream.

The selection component 206 can facilitate output of one or more recommendations at the communications device 102. For example, based on the respective weights assigned to the one or more multimedia content streams, the selection component 206 can determine which multimedia contents streams to recommend to the identified entity through the communications device 102 (e.g., via the interface component 112).

For example, the identified entity can be consuming streaming content at the communications device 102. Through the interface component 112, the identified entity can specify content that is of interest to the identified entity. Accordingly, the identified entity is able to customize recommendations and/or advertisements that are output at the communications device. In a similar manner, the identified entity can indicate content that is not interest to the identified entity. In addition to receiving direct feedback from the identified entity, the various aspects can infer preferences of the identified entity based on current interactions and/or historical interactions.

In another example a custom input feed (e.g., an input summary stream) can be output at the communications device 102, which can provide the identified entity control (e.g., through the interface component 112) over the recommendations received. For example, the identified entity can receive a custom input feed that can provide the identified entity control over the recommendations received. For example, the identified entity can define a custom input feed that the communications device 102 receives and the selection component 206 can utilize the custom input feed to find and offer related content to the identified entity.

In a specific example, the input feed identified by the communications device 102 can include a discussion of a particular actor (identified by real name, character name, or in another manner). Based on identification of the particular actor within the input feed, the non-limiting communications system 200 can be configured to obtain other roles played by the actor or other content in which the actor has performed. Thus, a recommendation can be output at the communications device 102 that provides a movie or a list of movies in which the actor has performed and which can be of interest to the identified entity. According to other examples, the input received can indicate a title of a movie of interest, a topic of interest, and so on.

In some implementations, the information is received from the communications device 102 automatically based on observing the identified entity's behavior and/or interactions, or based on conversations of the identified entity (both verbal or through manual interaction with the communications device 102). Accordingly, the identified entity input feed can provide the identified entity control over content discovery facilitated by the network device 104.

Figure 3:
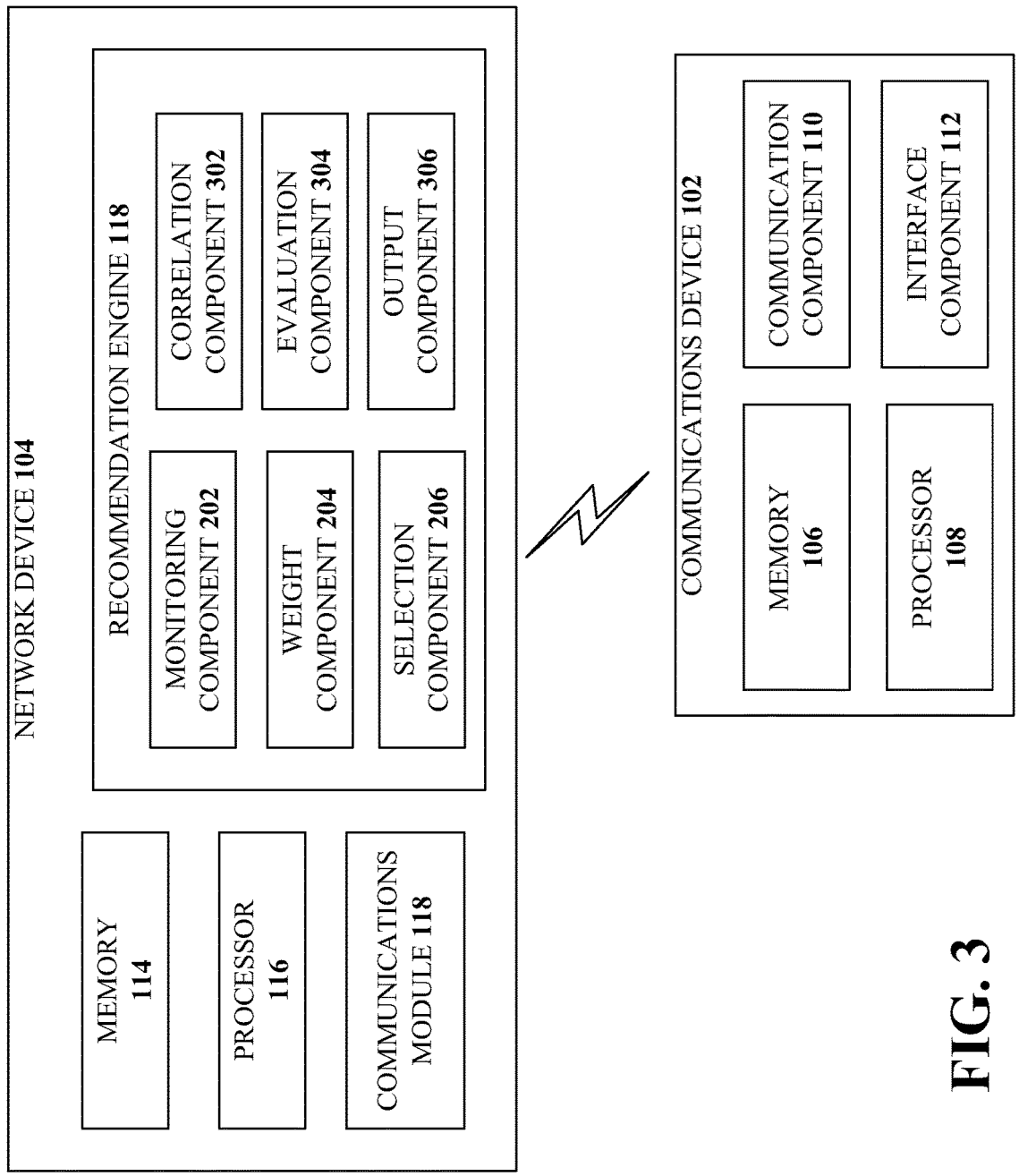
FIG. 3 illustrates an example, non-limiting communications system for providing customizable recommendations according to weights applied to one or more multimedia content streams based on monitored interactions in accordance with one or more embodiments described herein.

FIG. 3 illustrates an example, non-limiting communications system 300 for providing customizable recommendations according to weights applied to one or more multimedia content streams based on monitored interactions in accordance with one or more embodiments described herein. Repetitive description of like elements employed in other embodiments described herein is omitted for sake of brevity. The non-limiting communications system 300 can comprise one or more of the components and/or functionality of non-limiting communications system 100 and/or non-limiting communications system 200, and vice versa.

The non-limiting communications system 300 can include a correlation component 302, an evaluation component 304, and an output component 306. The monitoring component 202 can receive one or more monitored interactions determined to have been performed by an identified entity at the communications device 102. A correlation component 302 can determine if the monitored interaction is related to at least one content item of at least one multimedia content stream. For example, the content item can be an identification of an actor, a place, a topic, a product, and so on that can be included in a multimedia content stream. The content item can be identified based on keywords, phrases, or other data contained within the transaction. If the monitored interaction is not related to one or more content items, the transaction can be ignored. For example, the transaction can be between the identified entity and another entity (e.g., a friend, a family member) and could be about something other than multimedia streams (e.g., a personal matter, an event the entities are planning, and so on).

Based on the match between the monitored transactions and the one or more multimedia content streams, the weight component 204 can assign respective weights to the one or more multimedia content streams. The weights can be customizable by the non-limiting communications system 300 and/or by the identified entity through the communications device 102. For example, a first weight can be assigned for multimedia content streams determined to be of interest to the identified entity; a second weight can be assigned for multimedia content streams determined to most likely be of interest to the identified entity; a third weight can be assigned for multimedia content streams determined to be of little interest to the identified entity; and a fourth weight can be assigned for multimedia content streams determined to be of no interest to the identified entity. Although discussed with respect to four weights, any number of weights can be utilized with the disclosed aspects.

The evaluation component 304 can select one or more of the multimedia content streams based on the respective weights. The evaluation component 304 selects the one or more multimedia content streams for recommendation to the identified entity through the communications device 102. If none of the multimedia content streams recommended are chosen by the entity through the communications device 102, the evaluation component 304 can select one or more other multimedia content streams to recommend. This process can continue until a multimedia content stream is selected or an indication is received the communications device 102 to discontinue the output of the recommendations.

Based upon a selection of one of the one or more multimedia content streams, the output component 306 can facilitate output of the selected multimedia content stream at the communications device 102. For example, the output component 306 can provide an instruction to another network device that the multimedia content stream should be transmitted to the communications device. The instruction can also include other data, such as a time/day to output the multimedia content stream. Based on the instruction, the other network device can transmit to the multimedia content stream to the communications device 102. During output at the communications device 102, interactions by the identified entity at the communications device 102 can be observed and communicated to the network device 104 and further recommendations can be provided in accordance with the one or more aspects discussed herein.

Figure 4:
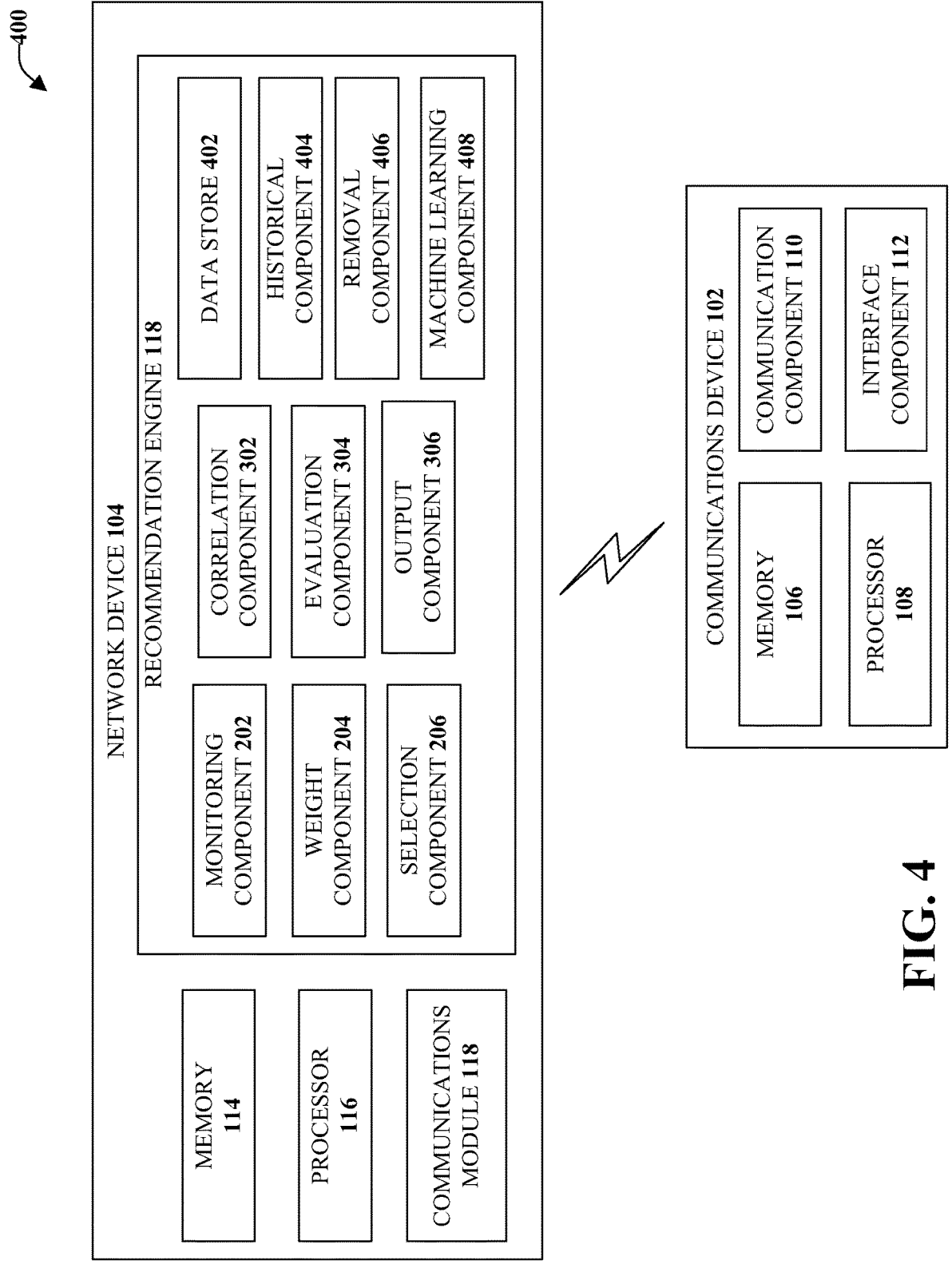
FIG. 4 illustrates an example, non-limiting communications system for facilitating output of one or more recommendations at a communications device based on monitored interactions performed at the communications device in accordance with one or more embodiments described herein.

FIG. 4 illustrates an example, non-limiting communications system 400 for facilitating output of one or more recommendations at a communications device based on monitored interactions performed at the communications device in accordance with one or more embodiments described herein. Repetitive description of like elements employed in other embodiments described herein is omitted for sake of brevity. The non-limiting communications system 400 can comprise one or more of the components and/or functionality of non-limiting communications system 100, non-limiting communications system 200, and/or non-limiting communications system 300, and vice versa.

The system can include a data store 402, a historical component 404, a removal component 406, and a machine learning component 408. The data store 402 can retain information related to one or more content items, one or more multimedia content streams, and respective weights assigned to the one or more content items and/or the one or more multimedia content streams.

The historical component 404 can obtain information related to historical interactions associated with the identified entity. The historical information can be utilized by the weight component 204 to determine a weight to be applied to a content item and/or a multimedia stream. For example, historical information can be accessed (e.g., from the data store 402 and/or memory 114) to evaluate a new multimedia content stream (e.g., a newly released movie, a newly released audio book, and so on). Further, the historical information can be compared with recently received interactions (e.g., what the identified entity is doing today) to determine whether there is a trend or pattern that would provide details as to an interest of the identified entity.

The removal component 406 can remove one or more content items and/or one or more multimedia content streams determined not to be of interest to the identified entity. For example, the identified entity could subscribe to an input summary feed (e.g., an RSS feed) and recommendations can be provided by the selection component 206 based on the input summary feed subscription. However, the identified entity might no longer be interested in the subject matter of the input summary stream and might unsubscribe from the feed and, therefore, the removal component 406 can remove the content items and/or multimedia content streams associated with the input stream.

Further, in an embodiment, the non-limiting communications system 400 can include a machine learning component 408. The machine learning component 408 can perform a set of machine learning computations associated with the monitored interactions, the one or more content items, and/or the one or more multimedia content streams. For example, the machine learning component 408 can determine an amount of interest the identified entity has in the or more content items, the monitored interactions of the identified entity that indicate interest, or disinterest, in one or more content items and/or one or more multimedia streams, respective weights to assign to the one or more content items and/or the one or more multimedia streams, adjustments to one or more respective weights based on the monitored behavior, and so on. According to another example, the machine learning component 408 can evaluate respective weights assigned to the one or more multimedia streams and facilitate output of one or more recommendations at the communications device 102. Further, the machine learning component 408 can evaluate monitored interactions based on the one or more recommendations of the one or more multimedia content streams and/or the respective weights assigned to the one or more content items and/or the one or more multimedia content streams.

The machine learning component 408 can utilize machine learning systems that have been explicitly or implicitly trained to learn, determine or infer identified entity interests, content items associated with the interests, multimedia content streams that include one or more of the content items, identified entity input related to one or more recommendations, and modifications to recommendations based on the input and/or other monitored interactions. It is to be appreciated that machine learning systems can be implemented in one or more of the components to generate explicitly and/or implicitly trained models that provide the recommendation outputs that are determined to be of interest to the identified entity. The machine learning systems can learn systems, networks, etc., identify interests of the identified entity, respective preferences of the identified entity, and so on in order to determine or infer one or more multimedia content streams that should be recommended to the identified entity.

According to some implementations, the interface component 112 (or respective interface components of the one or more computing devices as well as other interface components discussed herein) can provide a graphical user interface (GUI), a command line interface, a speech interface, Natural Language text interface, and the like. For example, a Graphical User Interface (GUI) can be rendered that provides a user with a region or means to load, import, select, read, and so forth, various requests and can include a region to present the results of the various requests. These regions can include known text and/or graphic regions that include dialogue boxes, static controls, drop-down-menus, list boxes, pop-up menus, as edit controls, combo boxes, radio buttons, check boxes, push buttons, graphic boxes, and so on. In addition, utilities to facilitate the information conveyance, such as vertical and/or horizontal scroll bars for navigation and toolbar buttons to determine whether a region will be viewable, can be employed. Thus, it might be inferred that the user did want the action performed.

The user can also interact with the regions to select and provide information through various devices such as a mouse, a roller ball, a keypad, a keyboard, a pen, gestures captured with a camera, a touch screen, and/or voice activation, for example. According to an aspect, a mechanism, such as a push button or the enter key on the keyboard, can be employed subsequent to entering the information in order to initiate information conveyance. However, it is to be appreciated that the disclosed aspects are not so limited. For example, merely highlighting a check box can initiate information conveyance. In another example, a command line interface can be employed. For example, the command line interface can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or Application Program Interface (API). In addition, the command line interface can be employed in connection with hardware (e.g., video cards) and/or displays (e.g., black and white, and Video Graphics Array (EGA)) with limited graphic support, and/or low bandwidth communication channels.

Methods that can be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 5:
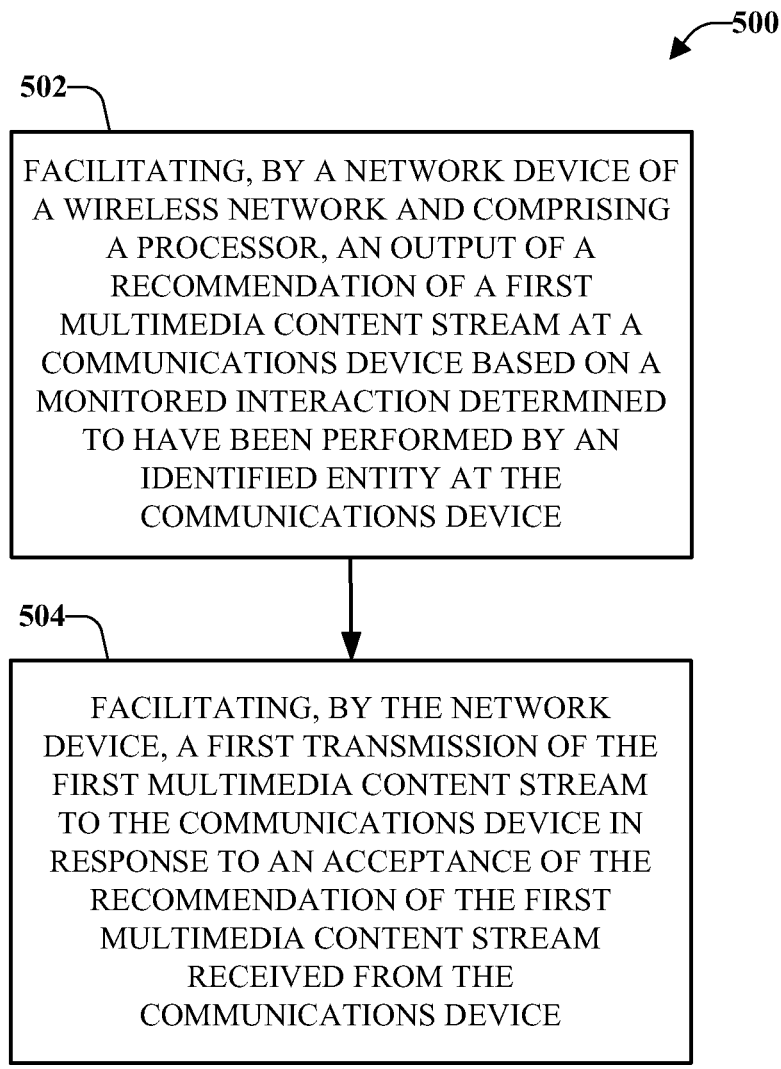
FIG. 5 illustrates a flow diagram of an example, non-limiting computer-implemented method for providing customized recommendations related to multimedia content streams in accordance with one or more embodiments described herein.

FIG. 5 illustrates a flow diagram of an example, non-limiting computer-implemented method 500 for providing customized recommendations related to multimedia content streams in accordance with one or more embodiments described herein. The non-limiting computer-implemented method 500 begins at 502 with facilitation of an output of a recommendation of a first multimedia content stream at a communications device (e.g., via the selection component 206). The recommendation can be based on a monitored interaction determined to have been performed by an identified entity at the communications device. The monitored interaction can be determined to be related to a content item of the first multimedia content stream. Further, the recommendation of the multimedia content stream can be based on a comparison between a weight assigned to the first multimedia content stream and respective weights assigned to second multimedia content streams that comprise the content item. The weight can be determined based on the monitored interaction and historical interactions of the identified entity.

At 504, the non-limiting computer-implemented method 500 can facilitate a first transmission of the first multimedia content stream to the communications device in response to an acceptance of the recommendation of the first multimedia content stream received from the communications device (e.g., via the output component 306). The first multimedia content stream can be renderable for consumption at the communications device.

Figure 6:
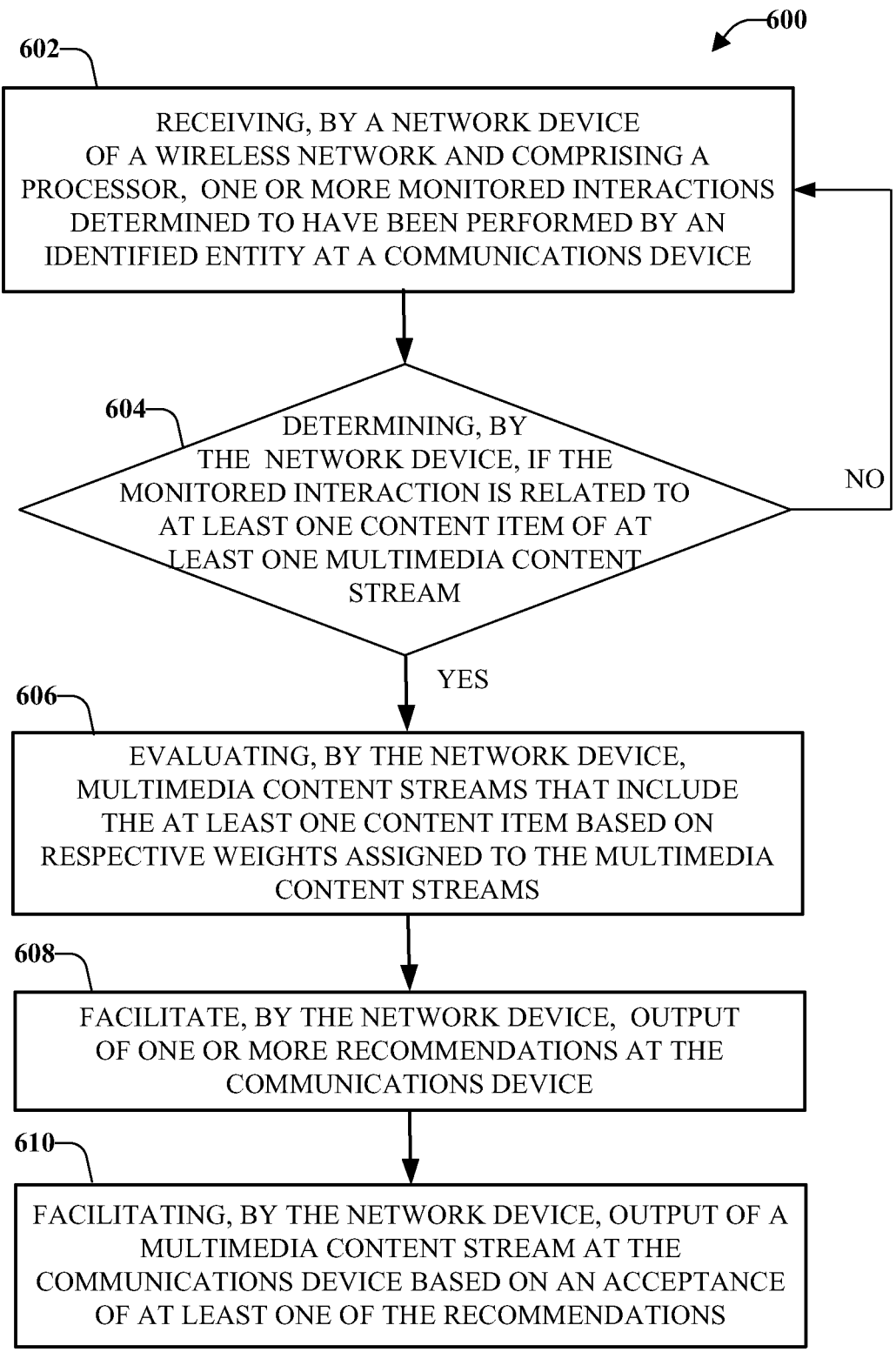
FIG. 6 illustrates a flow diagram of an example, non-limiting computer-implemented method for monitoring interactions and providing customizable recommendations based on the monitored interactions in accordance with one or more embodiments described herein.

FIG. 6 illustrates a flow diagram of an example, non-limiting computer-implemented method 600 for monitoring interactions and providing customizable recommendations based on the monitored interactions in accordance with one or more embodiments described herein. At 602, one or more monitored interactions at a communications device are received (e.g. via the monitoring component 202). The monitored interactions can be electronic communications, electronic interactions, and/or electronic transactions determined to have been performed by an identified entity at one or more communications devices associated with the identified entity.

At 604, a determination is made whether the monitored interaction is related to a content item of at least one multimedia content stream (e.g., via the correlation component 302). For example, if the communication is an electronic communication performed through the communications device (e.g., a phone call), a determination can be made whether the identified entity is discussing a content item that is included in a data store of content items. If the monitored interaction does not include at least one content item included in the data store of content items ("NO"), the non-limiting computer-implemented method 600 continues, at 602 with receipt of a monitored interaction.

If the monitored interaction includes the at least one content item ("YES"), method continues, at 606, and multimedia content streams that include the at least one content item are evaluated based on respective weights assigned to the multimedia content streams (e.g., via the weight component 204). For example, the weights can provide an indication as to the relevancy of the content item to the viewer (e.g., based on the viewer's preferences). Thus, if it is determined that the viewer is very interested in the content item, the weight assigned can be higher for that content item as compared to another content item for which the viewer is only slightly interested.

Based on the respective weights, the non-limiting computer-implemented method 600, at 608, can facilitate output of one or more recommendations of one or more multimedia content streams at the communications device (e.g., via the selection component 206). For example, a first multimedia content stream that includes a first content item that is weighed more heavily than a second multimedia content stream that includes a second content item can be output as a first recommendation while the second multimedia can be output as a second recommendation. According to some implementations, an accumulation of weights on content items within a multimedia output stream can be utilized to determine the overall weight for the multimedia content stream. In accordance with some implementations, a content item could be assigned a negative weight based upon a determination that the viewer is not at all interested in the content item (which can indicate that a multimedia content stream containing that content item should not be output to the viewer).

At 610, output of a multimedia content stream at the communications device is facilitated based on an acceptance of at least one of the recommendations (e.g., via the output component 306). The output at the communications device can be performed at a time selected by the viewer or at a different time (e.g., a time defined by a determined scheduled output of the multimedia content stream). The output can be in a perceivable format at the communications device allowing for consumption of the multimedia content stream by the viewer.

Figure 7:
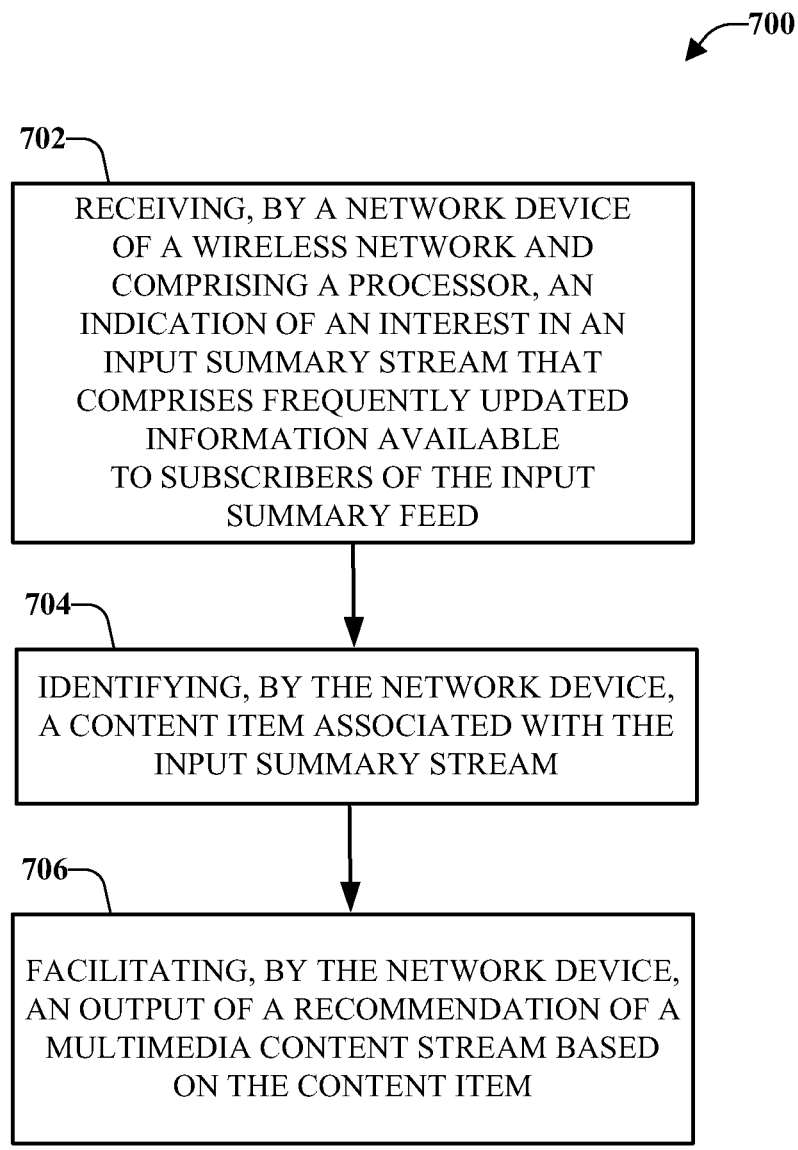
FIG. 7 illustrates a flow diagram of an example, non-limiting computer-implemented method for monitoring interactions and providing customizable recommendations based on the monitored interactions in accordance with one or more embodiments described herein.

FIG. 7 illustrates a flow diagram of an example, non-limiting computer-implemented method 700 for monitoring interactions and providing customizable recommendations based on the monitored interactions in accordance with one or more embodiments described herein. At 702, a network device of a wireless network and comprising a processor, receives an indication of an interest in an input summary stream that comprises frequently updated information available to subscribers of the input summary feed (e.g., via the monitoring component 202). In an example, the input summary stream can be a rich site summary (RSS) stream and the frequently updated information can be provided in a web feed format. Further, the input summary stream can comprise text and metadata.

At 704, a content item associated with the input summary stream can be identified (e.g., via the correlation component 302). For example, the content item can be a topic of the input summary stream. In another example, the content item can be an behavior or transaction observed at a communications device. The observed transaction can be a interaction that a viewer performs at the communications device. For example, during viewing of the input summary feed, the viewer might select more information related to content of the input summary feed. Based on this action, it could be inferred that the viewer is interested in one or more content items included in the content selected by the viewer. An output of a recommendation of a multimedia content stream can be facilitated by the network device, at 706 (e.g., via the selection component 206).

In an example, an output of a recommendation of a first multimedia content stream can be facilitated by the network device as described with respect to the non-limiting computer-implemented method 500 of FIG. 5. Further, the network device can determine that a second recommendation should be provided based on the non-limiting computer-implemented method 700 of FIG. 7. The second recommendation can be for a recommendation of a second multimedia content stream. The determination of the second multimedia content stream can be made based on a comparison between a weight assigned to the second multimedia stream and respective weights assigned to other multimedia content streams that comprises the second content item. Further, the first recommendation of the first multimedia content stream and the second recommendation of the second multimedia content streams can be based on a first weight assigned to the first multimedia content stream, a second weight assigned to the second multimedia content stream, and other weights assigned to other multimedia content streams that include the first content item or the second content item. According to some implementations, a multimedia content stream that comprises both the first content item and the second content item can be assigned a higher weight than a multimedia content stream that comprises only one of the first content item or the second content item. The respective weights can indicate a rank ordering between the various multimedia content streams. Further, the rank ordering can indicate a interest level of the viewer.

Figure 8:
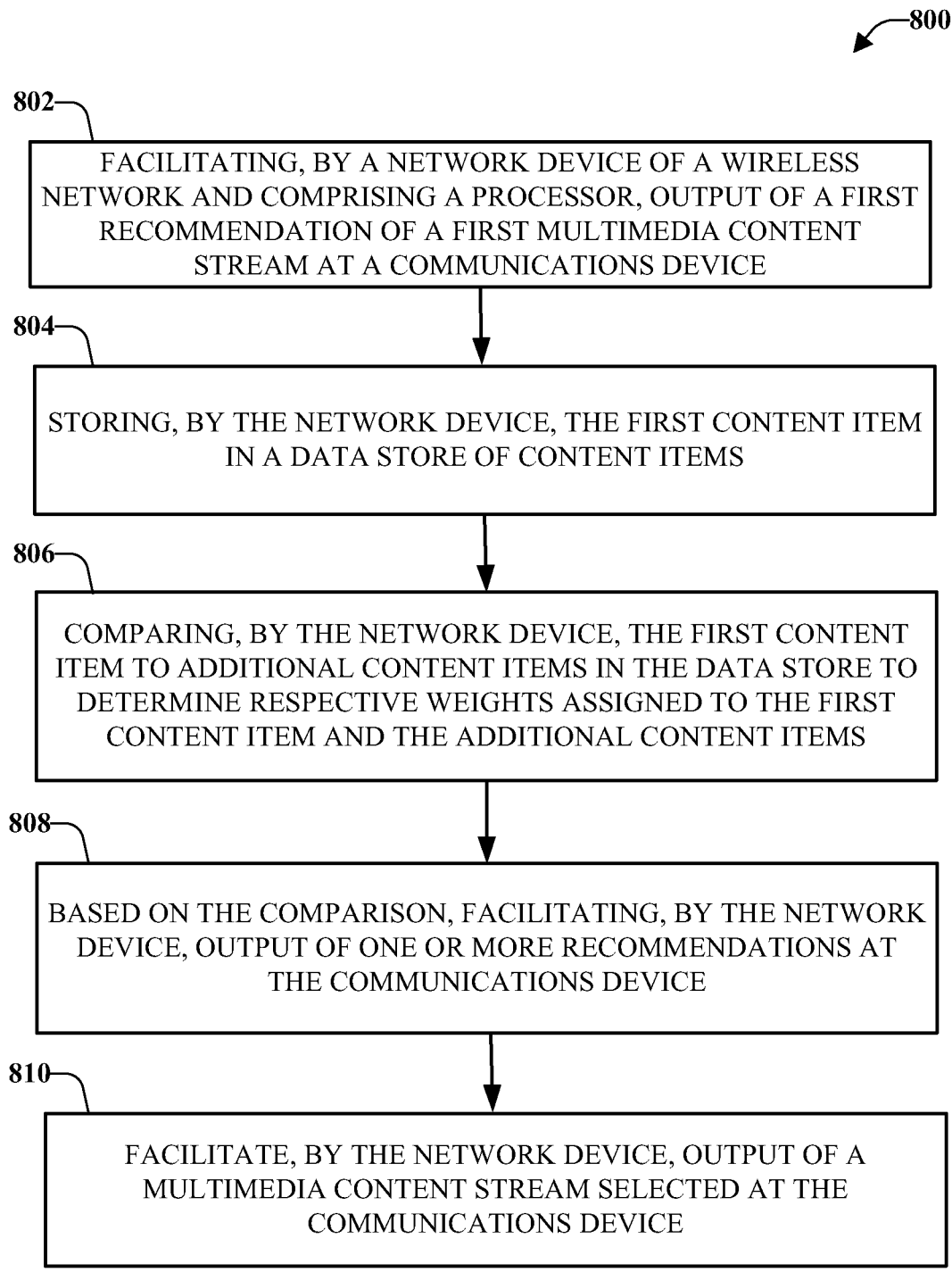
FIG. 8 illustrates a flow diagram of an example, non-limiting computer-implemented method for providing customizable recommendations of additional multimedia content streams based on the monitored interactions and historical data in accordance with one or more embodiments described herein.

FIG. 8 illustrates a flow diagram of an example, non-limiting computer-implemented method 800 for providing customizable recommendations of additional multimedia content streams based on the monitored interactions and historical data in accordance with one or more embodiments described herein.

At 802, a network device of a wireless network and comprising a processor facilitates output of a first recommendation of a first multimedia content stream at a communications device (e.g., via the selection component 206). The first recommendation can be determined based on a monitored interaction determined to have been performed by an identified entity at the communications device. The monitored interaction can be determined to be related to a first content item of the first multimedia content stream. Further, the recommendation of the multimedia content stream can be based on a comparison between a first weight assigned to the first multimedia content stream and respective weights assigned to second multimedia content streams that comprise the first content item. The weight can be determined based on the monitored interactions and historical interactions of the identified entity. The network device can store the first content item in a data store of content items, at 804 (e.g., via the data store 402).

The first content item can be compared, by the network device, to additional content items in the data store to determine respective weights assigned to the first content item and the additional content items, at 806 (e.g., via the weight component 204). For example, the first content item can be compared to a second content item, a third content item, and subsequent content items. Based on the comparison, output of one or more recommendations can be facilitated at the communications device, at 808 (e.g., via the selection component 206). For example, if a third multimedia content stream has a weight assigned that is determined to be higher than a first weight of the first multimedia content stream and a second weight of a second multimedia content stream, the network device can output a recommendation for the third multimedia content stream prior to, or higher in a listing, than the first multimedia content stream and the second multimedia content stream. At 810, output of a multimedia content stream selected can be facilitated at the communications device (e.g., via the output component 306). The output can be at a time and a place (e.g., one of multiple communications devices associated with the identified entity) as selected by the viewer.

Figure 9:
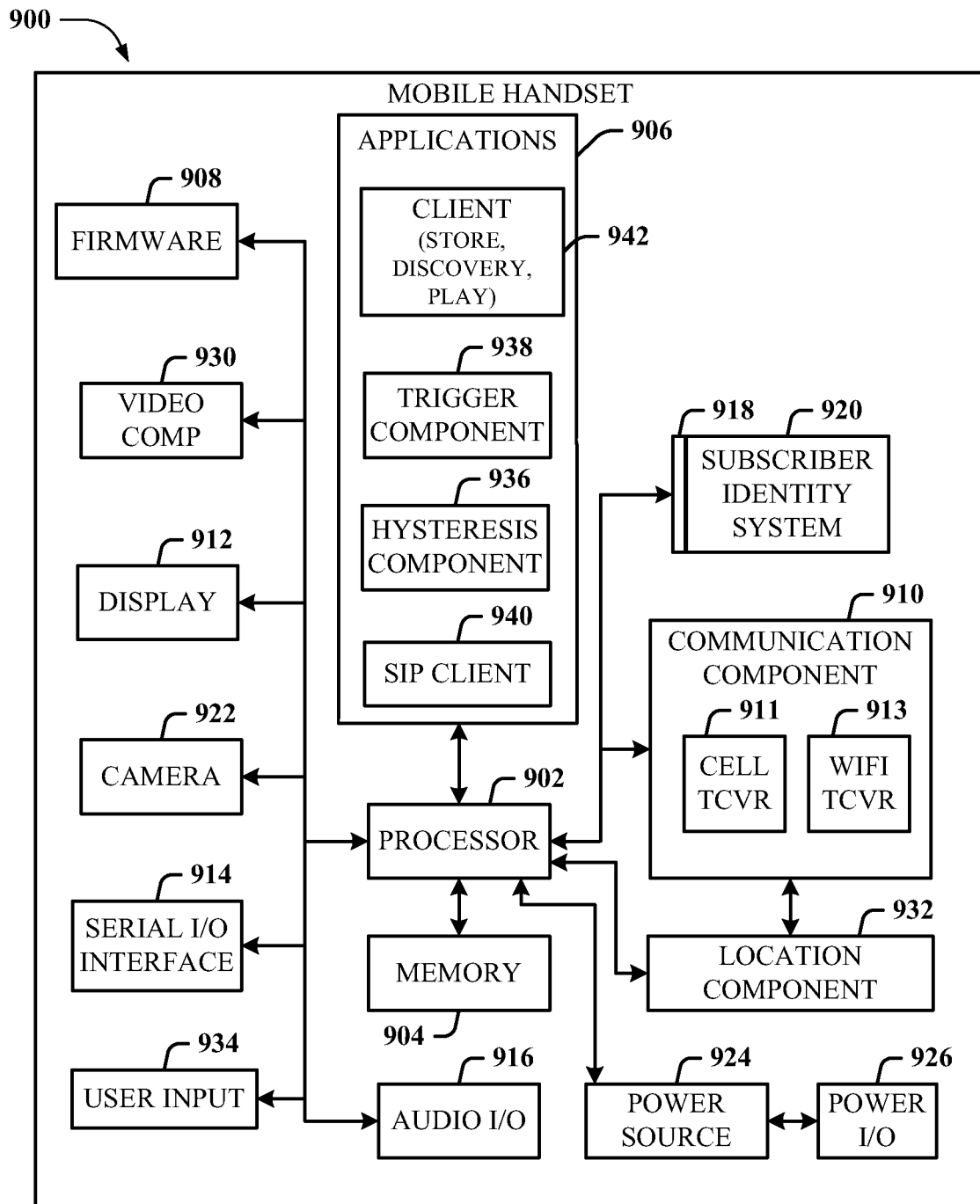
FIG. 9 illustrates an example block diagram of an example mobile handset operable to engage in a system architecture that facilitates wireless communications according to one or more embodiments described herein.

Referring now to FIG. 9, illustrated is a schematic block diagram of an exemplary end-user device such as a mobile device or handset 900 capable of connecting to a network in accordance with some embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
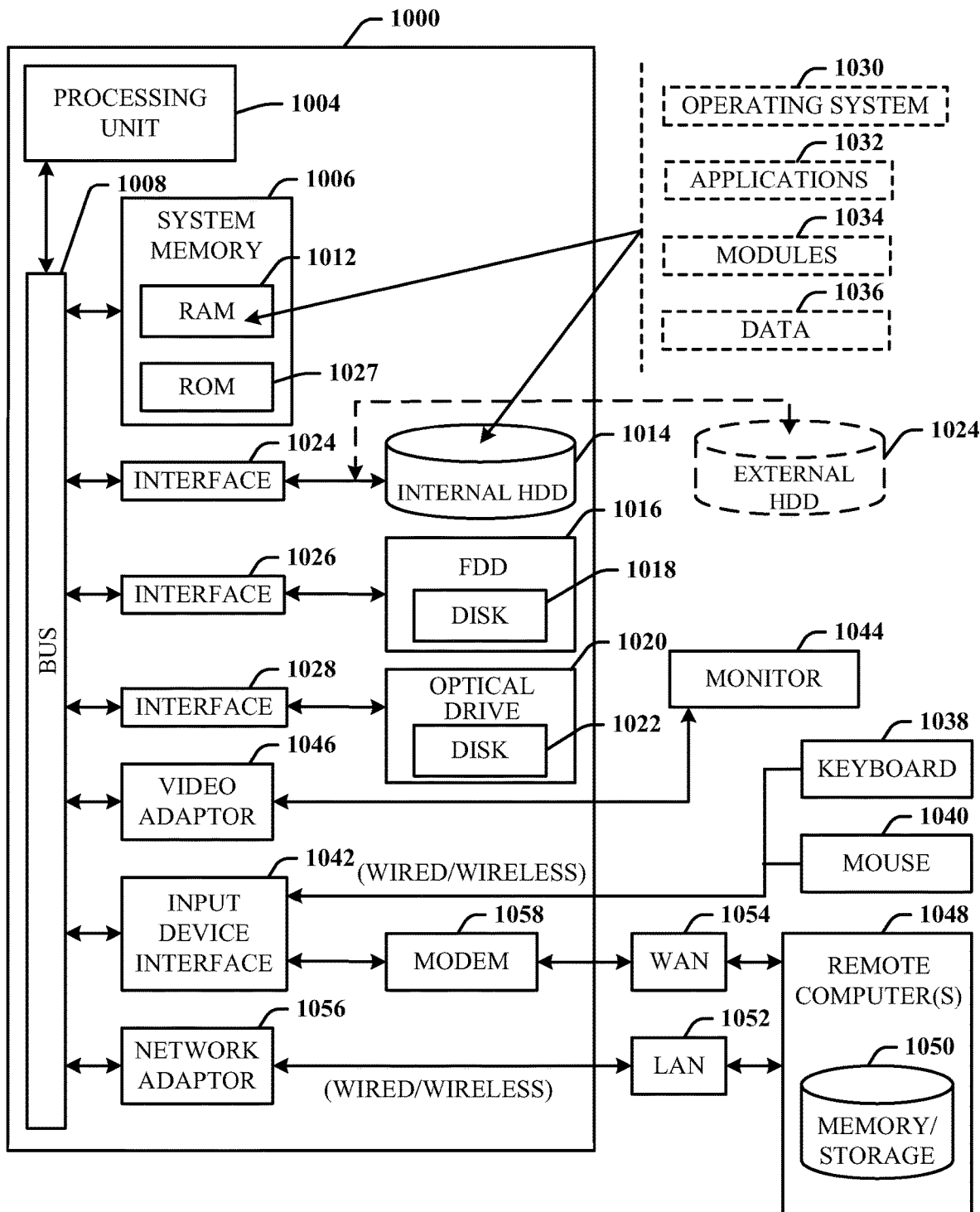
FIG. 10 illustrates an example block diagram of an example computer operable to engage in a system architecture that facilitates wireless communications according to one or more embodiments described herein.

Referring now to FIG. 10, there is illustrated a block diagram of a computer 1000 operable to execute a system architecture that facilitates establishing a transaction between an entity and a third party. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As utilized herein, terms "component," "engine," "module," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    facilitating, by a system comprising a memory and a processor, an output, at a user equipment, of a recommendation of a first multimedia content stream that comprises a content item based on a comparison between a first weight assigned to the first multimedia content stream and a second weight assigned to a second multimedia content stream that comprises the content item, wherein the first weight and the second weight are assigned based on respective determined interests at the user equipment for the first multimedia content stream and the second multimedia content stream; and
    facilitating, by the system, respective transmissions of the first multimedia content stream and the second multimedia content stream to the user equipment in an order of transmission based on a defined transmission order.

2. The method of claim 1, wherein the facilitating of the recommendation comprises assigning a rank to the first multimedia content stream based on interactions performed at the user equipment, and wherein at least one interaction of the interactions is related to the content item.

3. The method of claim 2, wherein the interactions comprise a social network interaction that comprises an indication of the content item.

4. The method of claim 2, further comprising:
    prior to the facilitating of the recommendation, monitoring, by the system, audible conversation streams at the user equipment; and
    identifying, by the system, the content item within an audible conversation stream of the audible conversation streams.

5. The method of claim 1, wherein the recommendation is a first recommendation, and wherein the method further comprises:
    receiving, by the system, an acceptance of the first recommendation; and
    facilitating, by the system, a second recommendation of a third multimedia content stream, wherein the second recommendation is based on a third weight assigned to the third multimedia content stream, and wherein the third multimedia content stream comprises the content item.

6. The method of claim 1, further comprising:
    receiving, by the system, a denial of the recommendation of the first multimedia content stream; and
    modifying, by the system, the first weight assigned to the first multimedia content stream from a first level that indicates interest in the first multimedia content stream to a second level that indicates a lack of interest in the first multimedia content stream.

7. The method of claim 1, further comprising:
    receiving, by the system, a denial of the recommendation of the first multimedia content stream; and
    removing, by the system, the content item from a data store of content items based on the denial, wherein the removing discontinues recommendation of multimedia content streams, comprising the first multimedia content stream and the second multimedia content stream, based on the content item.

8. The method of claim 1, further comprising:
    prior to the facilitating of the recommendation, assigning the first weight to the first multimedia content stream and the second weight to the second multimedia content stream based on a monitored interaction performed at the user equipment and historical interactions performed at the user equipment.

9. The method of claim 8, wherein the monitored interaction comprises a request for multimedia content streams that comprise a defined content item, and wherein the content item is determined to comprise the defined content item.

10. The method of claim 1, wherein the first weight and the second weight indicate a rank ordering between the first multimedia content stream and the second multimedia content stream.

11. A system, comprising:
    a processor; and
    a memory that stores executable instructions that, when executed by the processor, facilitate performance of operations, comprising:

outputting a first recommendation of a first multimedia content stream based on a comparison between a first weight assigned to the first multimedia content stream and a second weight assigned to a second multimedia content stream, wherein the first multimedia content stream and the second multimedia content stream are determined to comprise a content item, wherein the first weight is indicative of a first amount of interest in the first multimedia content stream at a communications device, wherein the second weight is indicative of a second amount of interest in the second multimedia content stream at the communications device, and wherein the first amount of interest is greater than the second amount of interest; and transmitting the first multimedia content stream and the second multimedia content stream to the communications device in an order of transmission based on a selection received from the communications device.

12. The system of claim 11, wherein the operations further comprise:

monitoring a social network interaction at the communications device; and determining that an indication of the content item of the first multimedia content stream is a subject of the social network interaction.

13. The system of claim 11, wherein the operations further comprise:

monitoring an audible conversation stream at the communications device; and determining that an indication of the content item of the first multimedia content stream is a subject of the audible conversation stream.

14. The system of claim 11, wherein the comparison is a first comparison, and wherein the operations further comprise:

based on receipt of an acceptance of the first recommendation, outputting a second recommendation of a third multimedia content stream based on a second comparison between a third weight assigned to the third multimedia content stream, the first weight, and the second weight, wherein the third multimedia content stream comprises the content item; and transmitting the third multimedia content stream to the communications device.

15. The system of claim 11, wherein the content item is a first content item, wherein the comparison is a first comparison, and wherein the operations further comprise:

in response to an indication of an interest in an input summary feed, identifying a second content item, wherein the input summary feed comprises updated information available to subscribers of the input summary feed; and outputting a second recommendation of a third multimedia content stream that comprises the second content item, wherein the third multimedia content stream is selected based on a second comparison between a third weight assigned to the third multimedia content stream, the first weight, and the second weight.

16. The system of claim 15, wherein the indication is a first indication, and wherein the operations further comprise:

in response to a second indication that the interest in the input summary feed is no longer present, removing the second recommendation from a group of recommendations provided to the communications device.

17. A non-transitory computer-readable medium, comprising executable instructions that, when executed by a processor, facilitate performance of operations, comprising:

sending, to a user equipment, a recommendation of a first multimedia content stream that comprises a content item based on a comparison between a first weight assigned to the first multimedia content stream and a second weight assigned to a second multimedia content stream that comprises the content item, wherein the first weight and the second weight are assigned based on respective determined interests, at the user equipment, for the first multimedia content stream and the second multimedia content stream; and sending, to the user equipment, respective transmissions of the first multimedia content stream and the second multimedia content stream in an order of transmission based on a defined transmission order.

18. The non-transitory computer-readable medium of claim 17, wherein the operations further comprise:

monitoring a social network interaction at the user equipment; and determining an indication of the content item of the first multimedia content stream is a subject of the social network interaction.

19. The non-transitory computer-readable medium of claim 17, wherein the operations further comprise:

monitoring an audible conversation at the user equipment; and determining an indication of the content item of the first multimedia content stream is a subject of the audible conversation.

20. The non-transitory computer-readable medium of claim 17, wherein the recommendation is a first recommendation, wherein the comparison is a first comparison, and wherein the operations further comprise:

based on receipt of an acceptance of the first recommendation, outputting a second recommendation of a third multimedia content stream based on a second comparison between a third weight assigned to the third multimedia content stream, the first weight, and the second weight, wherein the third multimedia content stream comprises the content item.

* * * * *